United States Patent
Huang

(10) Patent No.: US 10,845,960 B2
(45) Date of Patent: Nov. 24, 2020

(54) METHOD AND SYSTEM FOR DYNAMICALLY DISPLAYING ICONS OF MOBILE TERMINAL

(71) Applicant: JRD COMMUNICATION (SHENZHEN) LTD., Shenzen (CN)

(72) Inventor: Shuwei Huang, Shenzhen (CN)

(73) Assignee: JRD COMMUNICATION (SHENZHEN) LTD., Shenzhen (CN)

( * ) Notice: Subject to any disclaimer, the term of this patent is extended or adjusted under 35 U.S.C. 154(b) by 0 days.

(21) Appl. No.: 16/343,972

(22) PCT Filed: Sep. 5, 2017

(86) PCT No.: PCT/CN2017/100492
§ 371 (c)(1),
(2) Date: Apr. 22, 2019

(87) PCT Pub. No.: WO2018/072568
PCT Pub. Date: Apr. 26, 2018

(65) Prior Publication Data
US 2019/0377462 A1    Dec. 12, 2019

(30) Foreign Application Priority Data
Oct. 23, 2016    (CN) .......................... 2016 1 0923835

(51) Int. Cl.
*G06F 3/0481* (2013.01)
*G06F 3/0482* (2013.01)
*G06F 3/01* (2006.01)

(52) U.S. Cl.
CPC ............ *G06F 3/0482* (2013.01); *G06F 3/017* (2013.01); *G06F 3/04815* (2013.01); *G06F 3/04817* (2013.01)

(58) Field of Classification Search
CPC .. G06F 3/0482; G06F 3/0346; G06F 3/04815; G06F 3/04817; G06F 1/1626
See application file for complete search history.

(56) References Cited

U.S. PATENT DOCUMENTS

| | | | |
|---|---|---|---|
| 8,429,564 B2 * | 4/2013 | Alexanderovitc | .... G06F 1/1626 715/757 |
| 2010/0064259 A1 * | 3/2010 | Alexanderovitc | .... G06F 1/1626 715/852 |

(Continued)

FOREIGN PATENT DOCUMENTS

| | | |
|---|---|---|
| CN | 103218060 A | 7/2013 |
| CN | 103793141 A | 5/2014 |

(Continued)

OTHER PUBLICATIONS

Clifford et al, "Measuring Tilt with Low-g Accelerometers" (Year: 2005).*

*Primary Examiner* — Namitha Pillai
(74) *Attorney, Agent, or Firm* — Kirton McConkie; Evan R. Witt

(57) ABSTRACT

A method and system for dynamically displaying icons on a mobile terminal. The method comprises: A: acquiring a spatial position status of a current mobile terminal, and obtaining, according to the spatial position status, the included angle between the mobile terminal and the horizontal plane; B: acquiring a spatial position status of a display interface of the current mobile terminal, and obtaining, according to the spatial position status of the display interface, the included angle between the display interface and the horizontal plane; and C: controlling, according to the included angle between the mobile terminal and the horizontal plane and the included angle between the display interface and the horizontal plane, the angle of inclination of icons in the display interface with respect to the display (Continued)

interface to be the same as the included angle between the mobile terminal and the horizontal plane.

8 Claims, 3 Drawing Sheets

(56) References Cited

U.S. PATENT DOCUMENTS

2011/0320983 A1* 12/2011 Chen ........................ G06F 3/01
 715/836
2017/0308345 A1* 10/2017 He ........................ G06F 3/0346

FOREIGN PATENT DOCUMENTS

| CN | 104951209 A | 9/2015 |
| CN | 105100396 A | 11/2015 |
| CN | 106406678 A | 2/2017 |

* cited by examiner

METHOD AND SYSTEM FOR DYNAMICALLY DISPLAYING ICONS OF MOBILE TERMINAL

BACKGROUND

1. Field of the Disclosure

The present invention relates to display control technologies, and more particularly, to a method and system for dynamically displaying icons on a mobile terminal.

2. Description

In the existing prior arts, mobile terminals have been widely used and become essential tools in human life. Users can use the mobile terminals to conduct voice communication, send mails, text, watch videos, read the news, or listen to music. Based on above functions, development and use of application programs having various functions bring convenience to human life. However, icons are displayed in two dimensions in most mobile terminals. When the users use the terminals, the display screen is varied according to the position of the terminal but icons on a display interface cannot be dynamically altered according to rotation of the terminal. Accordingly, little interaction is between the icons and users. Smart experiences subject to icons varied according to changes of the display interface are not brought to the users.

Therefore, there is a need to further improve the existing skills.

SUMMARY

In view of drawbacks of the existing prior arts, an objective of the present invention is to provide a method and system for dynamically displaying icons on a mobile terminal for users to overcome icons not able to be dynamically altered as a terminal or an interface is tilted in the existing prior arts.

To solve the technical problems, technical schemes provided by the present invention are described below.

A method for dynamically displaying icons on a mobile terminal, the icons of a display interface displayed in a three-dimensional (3D) virtual way, the method including steps of:

Step A: acquiring a spatial position status of a current mobile terminal, and obtaining an included angle between the mobile terminal and a horizontal plane according to the spatial position status;

Step B: acquiring a spatial position status of the display interface of the current mobile terminal, and obtaining an included angle between the display interface and the horizontal plane according to the spatial position status of the display interface;

Step C: according to the included angle between the mobile terminal and the horizontal plane and the included angle between the display interface and the horizontal plane, controlling a tilt angle of the icons on the display interface with respect to the display interface to be the same as the included angle between the mobile terminal and the horizontal plane.

In the method for dynamically displaying icons one the mobile terminal, Step A further includes:

Step A1: determining whether the obtained included angle between the mobile terminal and the horizontal plane is an even number or an odd number, executing Step A2 if it is the odd number, executing Step A3 if it is the even number;

Step A2: outputting a low voltage level signal to an angle dynamic detecting unit and controlling the angle dynamic detecting unit to further detect variations of the included angle after a predetermined period of time;

Step A3: outputting a high voltage level signal to the angle dynamic detecting unit and controlling the angle dynamic detecting unit to further detect variations of the included angle after a predetermined period of time.

In the method for dynamically displaying icons one the mobile terminal, Step B further includes:

Step B1: determining whether the obtained included angle between the display interface and the horizontal plane is an even number or an odd number, executing Step B2 if it is the odd number, executing Step B3 if it is the even number;

Step B2: outputting a low voltage level signal to an angle dynamic detecting unit and controlling the angle dynamic detecting unit to further detect variations of the included angle after a predetermined period of time;

Step B3: outputting a high voltage level signal to the angle dynamic detecting unit and controlling the angle dynamic detecting unit to further detect variations of the included angle after a predetermined period of time.

In the method for dynamically displaying icons one the mobile terminal, Step C further includes:

Step C1: according to the included angle between the mobile terminal and the horizontal plane, the included angle between the display interface and the horizontal plane, and equality between the included angle between the icons and the display interface and the included angle between the mobile terminal and the horizontal plane, calculating an included angle between the icons and the horizontal plane;

Step C2: controlling a tilt angle of 3D virtual icons with respect to the horizontal plane to rotate the 3D virtual icons to the included angle calculated in Step C1.

In the method for dynamically displaying icons one the mobile terminal, in Step A, the spatial position status of the current mobile terminal is acquired by using an acceleration sensor or a gyroscope disposed in the mobile terminal, and acceleration generated by movements of the current mobile terminal is acquired to determine the spatial position status of the current mobile terminal.

A system for dynamically displaying icons on a mobile terminal, including:

one or more processors;

a memory; and one or more application programs, stored in the memory and configured to be executed by the processor;

a terminal tilt angle detecting module, configured to acquire a spatial position status of a current mobile terminal, and obtain an included angle between the mobile terminal and a horizontal plane according to the spatial position status;

an interface tilt angle detecting module, configured to acquire a spatial position status of the display interface of the current mobile terminal, and obtain an included angle between the display interface and the horizontal plane according to the spatial position status of the display interface;

an icon tilt angle controlling module, configured to control a tilt angle of the icons on the display interface with respect to the display interface to be the same as the included angle between the mobile terminal and the horizontal plane, according to the included angle between the mobile terminal and the horizontal plane and the included angle between the display interface and the horizontal plane.

In the system for dynamically displaying icons one the mobile terminal, the terminal tilt angle detecting module includes:

a terminal included angle odd even determining unit, configured to determine whether the obtained included angle between the mobile terminal and the horizontal plane is an even number or an odd number;

an odd angle locating unit, configured to output a low voltage level signal to an angle dynamic detecting unit and controlling the angle dynamic detecting unit to further detect variations of the included angle after a predetermined period of time;

an even angle locating unit, configured to output a high voltage level signal to the angle dynamic detecting unit and controlling the angle dynamic detecting unit to further detect variations of the included angle after a predetermined period of time.

In the system for dynamically displaying icons one the mobile terminal, the interface tilt angle detecting module includes:

an interface included angle odd even determining unit, configured to determine whether the obtained included angle between the interface and the horizontal plane is an even number or an odd number;

an interface odd angle locating unit, configured to output a low voltage level signal to an angle dynamic detecting unit and controlling the angle dynamic detecting unit to further detect variations of the included angle after a predetermined period of time;

an interface even angle locating unit, configured to output a high voltage level signal to the angle dynamic detecting unit and controlling the angle dynamic detecting unit to further detect variations of the included angle after a predetermined period of time.

In the system for dynamically displaying icons one the mobile terminal, the icon tilt angle controlling module includes:

an included angle calculating unit, configured to calculate an included angle between the icons and the horizontal plane according to the included angle between the mobile terminal and the horizontal plane, the included angle between the display interface and the horizontal plane, and equality between the included angle between the icons and the display interface and the included angle between the mobile terminal and the horizontal plane;

an angle rotating controlling unit, configured to control a tilt angle of 3D virtual icons with respect to the horizontal plane to rotate the 3D virtual icons to an angle equal to the included angle between the mobile terminal and the horizontal plane.

In the system for dynamically displaying icons one the mobile terminal, in the terminal tilt angle detecting module, the spatial position status of the current mobile terminal is acquired by using an acceleration sensor or a gyroscope disposed in the mobile terminal.

The present invention further provides a system for dynamically displaying icons on a mobile terminal, including:

one or more processors;

a memory; and one or more application programs, stored in the memory and configured to be executed by the processor to perform steps of:

Step A: acquiring a spatial position status of a current mobile terminal, and obtaining an included angle between the mobile terminal and a horizontal plane according to the spatial position status;

Step B: acquiring a spatial position status of the display interface of the current mobile terminal, and obtaining an included angle between the display interface and the horizontal plane according to the spatial position status of the display interface;

Step C: according to the included angle between the mobile terminal and the horizontal plane and the included angle between the display interface and the horizontal plane, controlling a tilt angle of the icons on the display interface with respect to the display interface to be the same as the included angle between the mobile terminal and the horizontal plane.

In the system for dynamically displaying icons one the mobile terminal, Step A further includes:

Step A1: determining whether the obtained included angle between the mobile terminal and the horizontal plane is an even number or an odd number, executing Step A2 if it is the odd number, executing Step A3 if it is the even number;

Step A2: outputting a low voltage level signal to an angle dynamic detecting unit and controlling the angle dynamic detecting unit to further detect variations of the included angle after a predetermined period of time;

Step A3: outputting a high voltage level signal to the angle dynamic detecting unit and controlling the angle dynamic detecting unit to further detect variations of the included angle after a predetermined period of time.

In the system for dynamically displaying icons one the mobile terminal, Step B further includes:

Step B1: determining whether the obtained included angle between the display interface and the horizontal plane is an even number or an odd number, executing Step B2 if it is the odd number, executing Step B3 if it is the even number;

Step B2: outputting a low voltage level signal to an angle dynamic detecting unit and controlling the angle dynamic detecting unit to further detect variations of the included angle after a predetermined period of time;

Step B3: outputting a high voltage level signal to the angle dynamic detecting unit and controlling the angle dynamic detecting unit to further detect variations of the included angle after a predetermined period of time.

In the system for dynamically displaying icons one the mobile terminal, Step C further includes:

Step C1: according to the included angle between the mobile terminal and the horizontal plane, the included angle between the display interface and the horizontal plane, and equality between the included angle between the icons and the display interface and the included angle between the mobile terminal and the horizontal plane, calculating an included angle between the icons and the horizontal plane;

Step C2: controlling a tilt angle of 3D virtual icons with respect to the horizontal plane to rotate the 3D virtual icons to the included angle calculated in Step C1.

In the system for dynamically displaying icons one the mobile terminal, in Step A, the spatial position status of the current mobile terminal is acquired by using an acceleration sensor or a gyroscope disposed in the mobile terminal, and acceleration generated by movements of the current mobile terminal is acquired to determine the spatial position status of the current mobile terminal.

Beneficial effects: the present invention provides a method and system for dynamically displaying icons on a mobile terminal, which includes acquiring a spatial position status of a current mobile terminal, and obtaining an included angle between the mobile terminal and a horizontal plane according to the spatial position status; acquiring a spatial position status of the display interface of the current mobile terminal, and obtaining an included angle between the display interface and the horizontal plane according to the spatial position status of the display interface; according to the included angle between the mobile terminal and the horizontal plane and the included angle between the display interface and the horizontal plane, controlling a tilt angle of the icons on the display interface with respect to the display interface to be the same as the included angle between the mobile terminal and the horizontal plane, thereby achieving rotating the icons on the display interface as the mobile terminal pivots or rotates and satisfying the needs of users in smarter icon presenting.

DETAILED DESCRIPTION

To make the objectives, technical schemes, and advantages of the present invention more clear and specific, the present invention is described in further detail below with reference to the embodiments in accompanying with the appending drawings. It should be understood that the specific embodiments described herein are merely for explaining the present invention and the present invention is not limited thereto.

Figure 1:
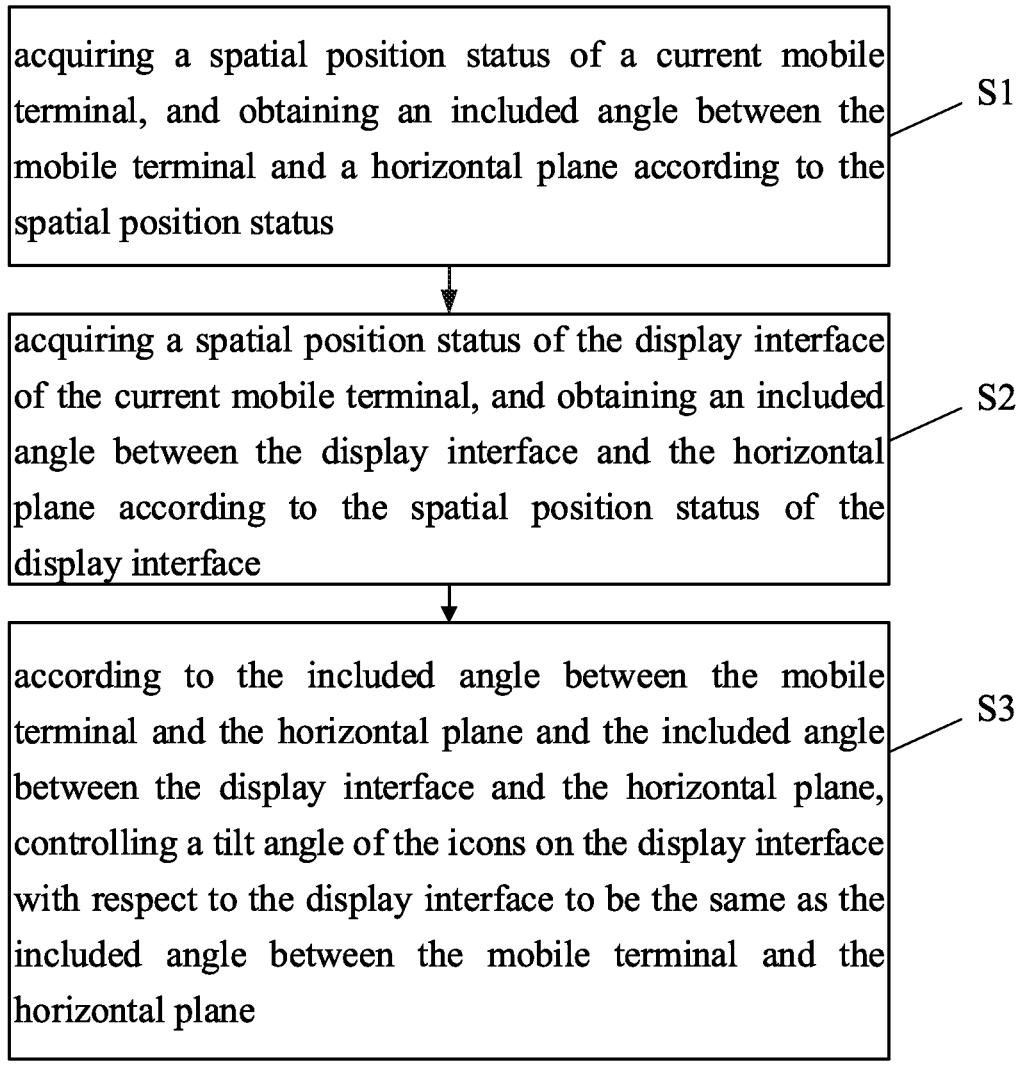
FIG. 1 is a flowchart of a method for dynamically displaying icons on a mobile terminal according to the present invention.

The present invention provides a method for dynamically displaying icons on a mobile terminal. As shown in FIG. 1, the icons of a display interface are displayed in a three-dimensional (3D) virtual way, and includes the following steps:

Step S1: acquiring a spatial position status of a current mobile terminal, and obtaining an included angle between the mobile terminal and a horizontal plane according to the spatial position status.

In this step, the spatial position status of the current mobile terminal is acquired. Accordingly, it needs an acceleration sensor or a gyroscope used to acquiring the spatial position status to be disposed in the mobile terminal. The spatial position status of the current mobile terminal is determined by obtaining acceleration generated by movements of the current mobile terminal.

After the spatial position status of the current mobile terminal is acquired, the included angle between the current mobile terminal and the horizontal plane is obtained by position information of the current mobile terminal. After three-dimensional coordinates are obtained based on the spatial position status, it can be easy to obtain the included angle between the current mobile terminal and the horizontal plane according to the three-dimensional coordinates.

Specifically, in order to locate the included angle between the mobile terminal and the horizontal plane more accurately, this step further includes the following steps.

Step S1 further includes:

Step S11: determining whether the obtained included angle between the mobile terminal and the horizontal plane is an even number or an odd number, executing Step S12 if it is the odd number, executing Step S13 if it is the even number;

Step S12: outputting a low voltage level signal to an angle dynamic detecting unit and controlling the angle dynamic detecting unit to further detect variations of the included angle after a predetermined period of time;

Step S13: outputting a high voltage level signal to the angle dynamic detecting unit and controlling the angle dynamic detecting unit to further detect variations of the included angle after a predetermined period of time.

In above steps, whether the obtained included angle is an even number or an odd number is determined. If it is an odd number, a control end outputs the low voltage level signal to the angle dynamic detecting unit. After the predetermined period of time, the angle dynamic detecting unit is controlled to further detect values of the odd-numbered included angle, thereby achieving more accurately and fast locating the included angle between the terminal and the horizontal plane. Likewise, if it is an odd number, it is controlled to output the high voltage level signal to the angle dynamic detecting unit. After the predetermined period of time, the angle dynamic detecting unit is controlled to further detect values of the even-numbered included angle, thereby achieving more accurately and fast locating the included angle between the terminal and the horizontal plane. It can be seen that the angle dynamic detecting unit includes two different detecting sub units. One of them is an odd-numbered included angle detecting locating sub unit dedicated to track and locate the odd-numbered included angle. The other one of them is an even-numbered included angle detecting locating sub unit dedicated to track and locate the even-numbered included angle.

Step S2: acquiring a spatial position status of the display interface of the current mobile terminal, and obtaining an included angle between the display interface and the horizontal plane according to the spatial position status of the display interface;

In order to locate the position of the icons accurately, this step is to detect the spatial position status of the display interface of the mobile terminal to calculate to obtain the included angle between the display interface and the horizontal plane according to the spatial position status of the display interface.

Specifically, this step further includes:

Step S21: determining whether the obtained included angle between the display interface and the horizontal plane is an even number or an odd number, executing Step S22 if it is the odd number, executing Step S23 if it is the even number;

Step S22: outputting a low voltage level signal to an angle dynamic detecting unit and controlling the angle dynamic detecting unit to further detect variations of the included angle after a predetermined period of time;

Step S23: outputting a high voltage level signal to the angle dynamic detecting unit and controlling the angle dynamic detecting unit to further detect variations of the included angle after a predetermined period of time.

In order to locate specific position of the display interface and its tilt angle, as similar to above Step S1, odd number and even number checking is adopted for the detected included angle between the display interface and the horizontal plane. Based on whether it is an odd-numbered angle or an even-numbered angle, variations of the angle is further detected. In such a way, it can fast determine a next change of the angle and obtain more accurate angle data.

Step S3: according to the included angle between the mobile terminal and the horizontal plane and the included angle between the display interface and the horizontal plane, controlling a tilt angle of the icons on the display interface with respect to the display interface to be the same as the included angle between the mobile terminal and the horizontal plane.

In this step, according to the included angle between the mobile terminal and the horizontal plane and the included angle between the display interface and the horizontal plane, the icons on the display interface is controlled to dynamically rotate with respect to the display interface, and the rotated angle is as the same as the included angle between the mobile terminal and the horizontal plane.

Step S3 further includes:

Step S31: according to the included angle between the mobile terminal and the horizontal plane, the included angle between the display interface and the horizontal plane, and equality between the included angle between the icons and the display interface and the included angle between the mobile terminal and the horizontal plane, calculating an included angle between the icons and the horizontal plane;

Step S32: controlling a tilt angle of 3D virtual icons with respect to the horizontal plane to rotate the 3D virtual icons to the included angle calculated in Step S1.

It can be conceivable that the icons in the present invention are 3D virtual icons, and accordingly the 3D virtual icons can be disposed to have a certain degree of "parallax" with respect to the display interface, to provide icon dynamic presenting for users and satisfy the needs of users in smarter icon presenting.

In order to illustrate above method in more detail, the following is illustrated with embodiments of the method by using a tablet computer as an example of the mobile terminal.

The effect that is to be achieved in the method provided in the present invention is that when the display interface is dynamically presented the tablet computer is tilted along left-right directions and up-down directions, that is, with reference to a desktop of the display interface of the tablet computer icons on the interface are dynamically tilted as a whole as the tablet computer is tilted.

Figure 2:
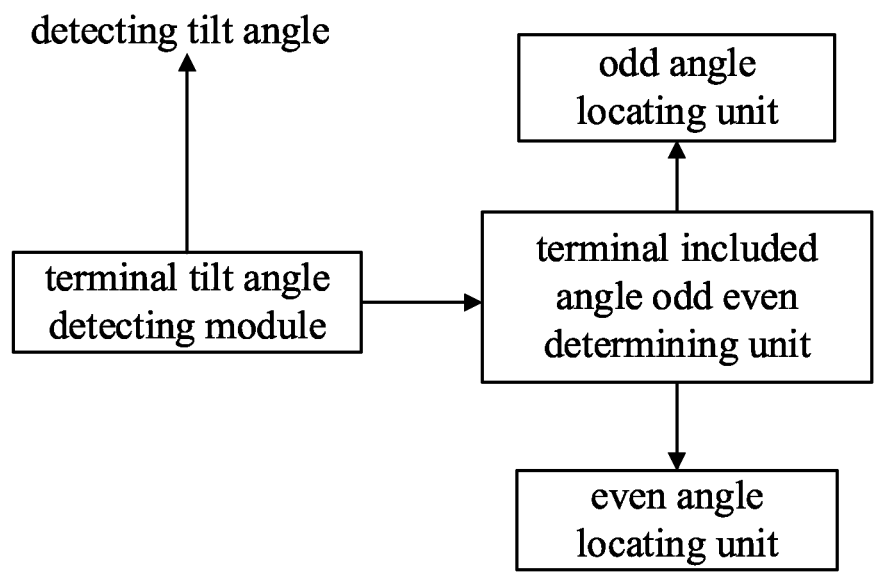
FIG. 2 is a schematic diagram illustrating a step of detecting an included angle between a terminal and a horizontal plane according to a method embodiment of the present invention.

Specifically, in the embodiments, as shown in FIG. 2, a terminal tilt angle detecting module may be deployed first. The terminal tilt angle detecting module is configured to detect an included angle between the tablet computer and a horizontal plane. An angle dynamic detecting unit is arranged in the terminal tilt angle detecting module. The angle dynamic detecting unit is configured to detect a tilt angle of the tablet computer, that is, an included angle between a front face of the tablet computer and the horizontal plane. For example, if the included angle between the tablet computer and the horizontal plane is a1, a terminal included angle odd even determining unit preset in the terminal tilt angle detecting module is used to determine whether the included angle a1 is an odd number or an even number. If the value of included angle a1 is an odd number, the terminal included angle odd even determining unit outputs a level subject to a number 0 to an angle locating unit. By using the angle locating unit to further detect variations of the odd-numbered included angle after a predetermined period of time, the included angle between the terminal and the horizontal plane is fast located. If the value of included angle a1 is an even number, the terminal included angle odd even determining unit outputs a level subject to a number 1 to the angle locating unit. By using the angle locating unit to further detect variations of the even-numbered included angle after a predetermined period of time, the included angle between the terminal and the horizontal plane is fast located.

Figure 3:
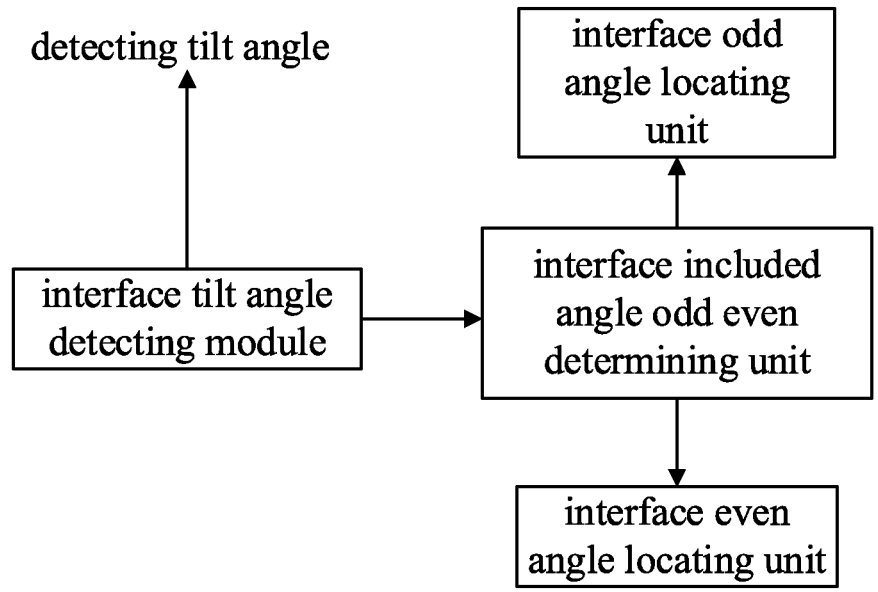
FIG. 3 is a schematic diagram illustrating a step of detecting an included angle between an interface and a horizontal plane according to a method embodiment of the present invention.

Secondly, as shown in FIG. 3, an interface tilt angle detecting module may be deployed first. The interface tilt angle detecting module is configured to detect an included angle between the interface on a display screen of the tablet computer and the horizontal plane. An interface angle dynamic detecting unit is arranged in the interface tilt angle detecting module. The interface angle dynamic detecting unit is configured to detect a tilt angle of the interface with respect to the horizontal plane, that is, an included angle between the display interface and the horizontal plane. For example, if the included angle between the display interface and the horizontal plane is a2, an interface included angle odd even determining unit preset in the interface tilt angle detecting module is used to determine whether the included angle a2 is an odd number or an even number. If the value of included angle a2 is an odd number, the interface included angle odd even determining unit outputs a level subject to a number 0 to an angle locating unit. By using the angle locating unit to further detect variations of the odd-numbered included angle after a predetermined period of time, the included angle between the interface and the horizontal plane is fast located. If the value of included angle a1 is an even number, the interface included angle odd even determining unit outputs a level subject to a number 1 to the angle locating unit. By using the interface angle locating unit to further detect variations of the even-numbered included angle after a predetermined period of time, the included angle between the display interface and the horizontal plane is fast located.

Finally, according to the included angle between the terminal and the horizontal plane and the included angle between the display interface and the horizontal plane, the included angle between the display interface and the icons on the display interface is controlled such that a tilt angle of the icons with respect to a desktop of the display interface is equal to the included angle between the terminal and the horizontal plane, thereby achieving Synchronization between the included angle between the icons and the display interface and the included angle between the terminal and the horizontal plane.

Specifically, after the included angle between the display interface and the horizontal plane is known, the position of the display interface is located, and based on the included angle between the terminal and the horizontal plane, the included angle between the display interface and 3D virtual icons on the display interface is controlled to rotate to be equal to the included angle between the terminal and the horizontal plane.

Figure 4:
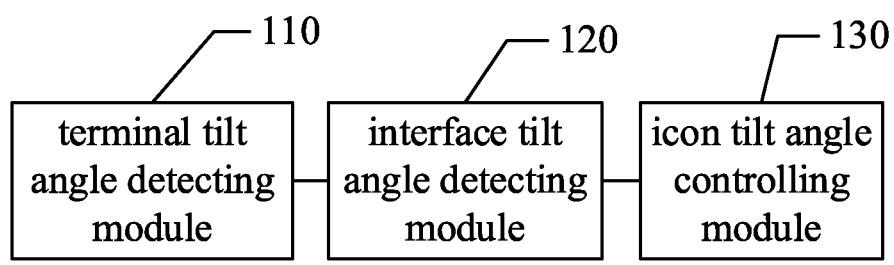
FIG. 4 is a schematic structural diagram showing a system for dynamically displaying icons on a mobile terminal according to the present invention.

Based on above method, as shown in FIG. 4, the present invention further discloses a system for dynamically displaying icons on a mobile terminal, which includes:

a terminal tilt angle detecting module 110, configured to acquire a spatial position status of a current mobile terminal, and obtain an included angle between the mobile terminal and a horizontal plane according to the spatial position status;

an interface tilt angle detecting module 120, configured to acquire a spatial position status of the display interface of the current mobile terminal, and obtain an included angle between the display interface and the horizontal plane according to the spatial position status of the display interface;

an icon tilt angle controlling module 130, configured to control a tilt angle of the icons on the display interface with respect to the display interface to be the same as the included angle between the mobile terminal and the horizontal plane, according to the included angle between the mobile terminal and the horizontal plane and the included angle between the display interface and the horizontal plane.

The terminal tilt angle detecting module includes:

a terminal included angle odd even determining unit, configured to determine whether the obtained included angle between the mobile terminal and the horizontal plane is an even number or an odd number;

an odd angle locating unit, configured to output a low voltage level signal to an angle dynamic detecting unit and controlling the angle dynamic detecting unit to further detect variations of the included angle after a predetermined period of time;

an even angle locating unit, configured to output a high voltage level signal to the angle dynamic detecting unit and controlling the angle dynamic detecting unit to further detect variations of the included angle after a predetermined period of time.

The interface tilt angle detecting module includes:

an interface included angle odd even determining unit, configured to determine whether the obtained included angle between the interface and the horizontal plane is an even number or an odd number;

an interface odd angle locating unit, configured to output a low voltage level signal to an angle dynamic detecting unit and controlling the angle dynamic detecting unit to further detect variations of the included angle after a predetermined period of time;

an interface even angle locating unit, configured to output a high voltage level signal to the angle dynamic detecting unit and controlling the angle dynamic detecting unit to further detect variations of the included angle after a predetermined period of time.

The icon tilt angle controlling module includes:

an included angle calculating unit, configured to calculate an included angle between the icons and the horizontal plane according to the included angle between the mobile terminal and the horizontal plane, the included angle between the display interface and the horizontal plane, and equality between the included angle between the icons and the display interface and the included angle between the mobile terminal and the horizontal plane;

an angle rotating controlling unit, configured to control a tilt angle of 3D virtual icons with respect to the horizontal plane to rotate the 3D virtual icons to an angle equal to the included angle between the mobile terminal and the horizontal plane.

The present invention provides a method and system for dynamically displaying icons on a mobile terminal, which includes acquiring a spatial position status of a current mobile terminal, and obtaining an included angle between the mobile terminal and a horizontal plane according to the spatial position status; acquiring a spatial position status of the display interface of the current mobile terminal, and obtaining an included angle between the display interface and the horizontal plane according to the spatial position status of the display interface; according to the included angle between the mobile terminal and the horizontal plane and the included angle between the display interface and the horizontal plane, controlling a tilt angle of the icons on the display interface with respect to the display interface to be the same as the included angle between the mobile terminal and the horizontal plane, thereby achieving rotating the icons on the display interface as the mobile terminal pivots or rotates and satisfying the needs of users in smarter icon presenting.

Figure 5:
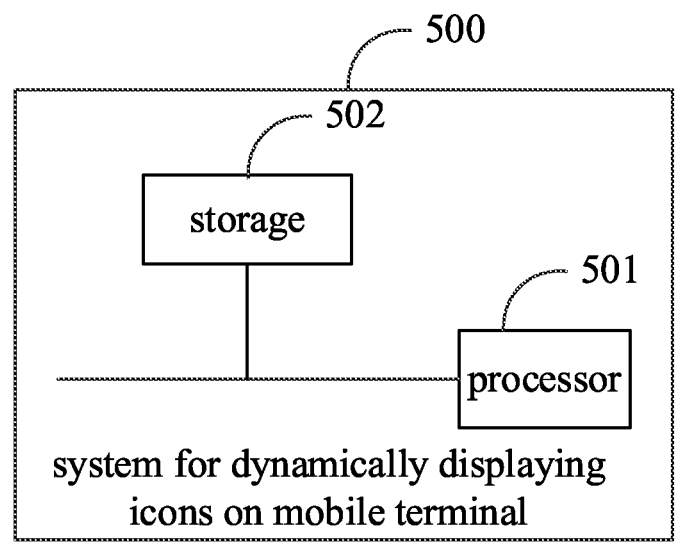
FIG. 5 is a schematic structural diagram showing a system for dynamically displaying icons on a mobile terminal according to an embodiment of the present invention.

It is noted that a person of ordinary skill in the art can realize that part or whole of the steps in the methods according to the above embodiments may be implemented by a program instructing relevant hardware. The program may be stored in a computer readable storage medium. The storage medium may include a Read-Only Memory (ROM), a Random Access Memory (RAM), a magnetic disk, or an optical disk, et al. For example, as shown in FIG. 5, in the embodiments of the present invention, the large-scaled photo loading system 500 includes a processor 501 and a storage 502. The storage 502 is connected to the processor 501. The program is stored in the storage 502 and is configured to be executed by the processor 501.

It should be understood that those of ordinary skill in the art may make equivalent modifications or variations according to the technical schemes and invention concepts of the present invention, but all such modifications and variations should be within the appended claims.

What is claimed is:

1. A method for dynamically displaying icons on a mobile terminal, the icons of a display interface displayed in a three-dimensional (3D) virtual way, the method comprising steps of:

Step A: acquiring a spatial position status of a current mobile terminal, and obtaining an included angle between the mobile terminal and a horizontal plane according to the spatial position status;

Step B: acquiring a spatial position status of the display interface of the current mobile terminal, and obtaining an included angle between the display interface and the horizontal plane according to the spatial position status of the display interface;

Step C: according to the included angle between the mobile terminal and the horizontal plane and the included angle between the display interface and the horizontal plane, controlling a tilt angle of the icons on the display interface with respect to the display interface to be the same as the included angle between the mobile terminal and the horizontal plane, wherein Step C further comprises:

Step C1: according to the included angle between the mobile terminal and the horizontal plane, the included angle between the display interface and the horizontal plane, and equality between the included angle between the icons and the display interface and the included angle between the mobile terminal and the horizontal plane, calculating an included angle between the icons and the horizontal plane; and Step C2: controlling a tilt angle of 3D virtual icons with respect to the horizontal plane to rotate the 3D virtual icons to the included angle calculated in Step C1.

2. The method according to claim 1, wherein Step A further comprises:

Step A1: determining whether the obtained included angle between the mobile terminal and the horizontal plane is an even number or an odd number, executing Step A2 if it is the odd number, executing Step A3 if it is the even number;

Step A2: outputting a low voltage level signal to an angle dynamic detecting unit and controlling the angle dynamic detecting unit to further detect variations of the included angle after a predetermined period of time;

Step A3: outputting a high voltage level signal to the angle dynamic detecting unit and controlling the angle dynamic detecting unit to further detect variations of the included angle after a predetermined period of time.

3. The method according to claim 1, wherein Step B further comprises:

Step B1: determining whether the obtained included angle between the display interface and the horizontal plane is an even number or an odd number, executing Step B2 if it is the odd number, executing Step B3 if it is the even number;

Step B2: outputting a low voltage level signal to an angle dynamic detecting unit and controlling the angle dynamic detecting unit to further detect variations of the included angle after a predetermined period of time;

Step B3: outputting a high voltage level signal to the angle dynamic detecting unit and controlling the angle dynamic detecting unit to further detect variations of the included angle after a predetermined period of time.

4. The method according to claim 1, wherein in Step A, the spatial position status of the current mobile terminal is acquired by using an acceleration sensor or a gyroscope disposed in the mobile terminal, and acceleration generated by movements of the current mobile terminal is acquired to determine the spatial position status of the current mobile terminal.

5. A system for dynamically displaying icons on a mobile terminal, comprising:
one or more processors;
a memory; and
one or more application programs, stored in the memory and configured to be executed by the processor to perform steps of:

Step A: acquiring a spatial position status of a current mobile terminal, and obtaining an included angle between the mobile terminal and a horizontal plane according to the spatial position status;

Step B: acquiring a spatial position status of the display interface of the current mobile terminal, and obtaining an included angle between the display interface and the horizontal plane according to the spatial position status of the display interface;

Step C: according to the included angle between the mobile terminal and the horizontal plane and the included angle between the display interface and the horizontal plane, controlling a tilt angle of the icons on the display interface with respect to the display interface to be the same as the included angle between the mobile terminal and the horizontal plane, wherein Step C further comprises:

Step C1: according to the included angle between the mobile terminal and the horizontal plane, the included angle between the display interface and the horizontal plane, and equality between the included angle between the icons and the display interface and the included angle between the mobile terminal and the horizontal plane, calculating an included angle between the icons and the horizontal plane;

Step C2: controlling a tilt angle of 3D virtual icons with respect to the horizontal plane to rotate the 3D virtual icons to the included angle calculated in Step C1.

6. The system according to claim 5, wherein Step A further comprises:

Step A1: determining whether the obtained included angle between the mobile terminal and the horizontal plane is an even number or an odd number, executing Step A2 if it is the odd number, executing Step A3 if it is the even number;

Step A2: outputting a low voltage level signal to an angle dynamic detecting unit and controlling the angle dynamic detecting unit to further detect variations of the included angle after a predetermined period of time;

Step A3: outputting a high voltage level signal to the angle dynamic detecting unit and controlling the angle dynamic detecting unit to further detect variations of the included angle after a predetermined period of time.

7. The system according to claim 5, wherein Step B further comprises:

Step B1: determining whether the obtained included angle between the display interface and the horizontal plane is an even number or an odd number, executing Step B2 if it is the odd number, executing Step B3 if it is the even number;

Step B2: outputting a low voltage level signal to an angle dynamic detecting unit and controlling the angle dynamic detecting unit to further detect variations of the included angle after a predetermined period of time;

Step B3: outputting a high voltage level signal to the angle dynamic detecting unit and controlling the angle dynamic detecting unit to further detect variations of the included angle after a predetermined period of time.

8. The system according to claim 5, wherein in Step A, the spatial position status of the current mobile terminal is acquired by using an acceleration sensor or a gyroscope disposed in the mobile terminal, and acceleration generated by movements of the current mobile terminal is acquired to determine the spatial position status of the current mobile terminal.

* * * * *